United States Patent Office 2,940,667
Patented June 14, 1960

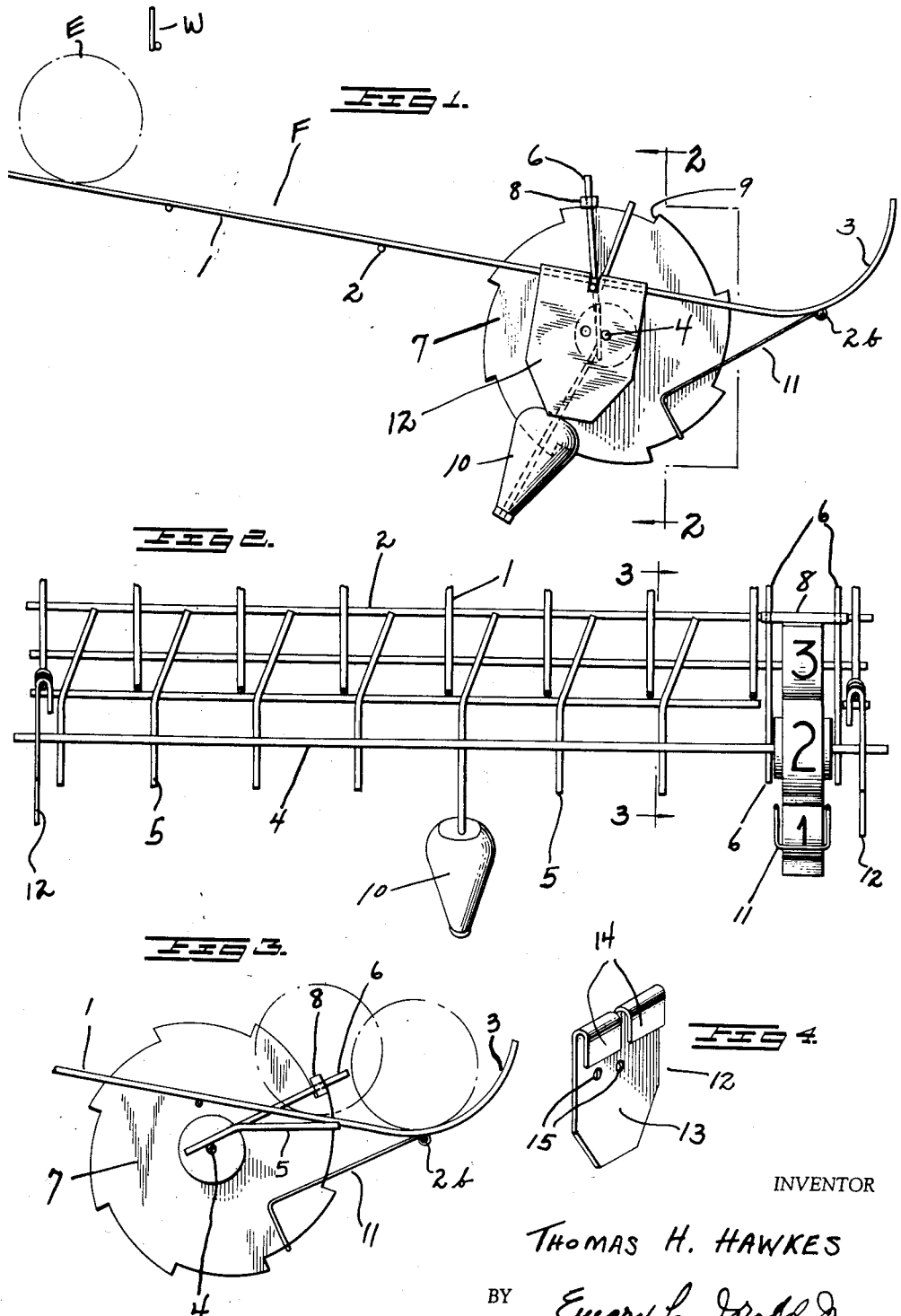

2,940,667

EGG COUNTING DEVICE

Thomas H. Hawkes, Rockville, Md., assignor of ten percent to Emory L. Groff, Jr., Rockville, Md.

Filed Sept. 18, 1957, Ser. No. 684,727

1 Claim. (Cl. 235—98)

This invention relates to an automatic, inexpensive egg counting device adapted to be readily attached to the inclined floor of a wire mesh poultry cage.

In recent years the use of cages for housing hens has become increasingly popular due to the fact that it affords some measure of checking on the egg production of the individual hen.

This is important from an economic standpoint, since a hen which lays only one or two eggs a week has as great a food consumption as a hen which lays five or six eggs a week. Thus, if it is known which hens are productive and which are not, those which are non-productive can be removed from the flock.

One method of manually keeping track of the egg production of individual hens now used by farmers is to move a clothespin starting from a wire at one side of the cage top to an adjacent wire each time they pick up an egg.

Another manual method is to have a small card attached to the cage and the person gathering the eggs will place a pencil mark on the card for each egg collected.

Still another manual method used is a hand-operated counter attached to the cage which requires the egg gatherer to rotate a disc each time an egg is collected.

All of the foregoing methods are objectionable since they are time-consuming and are only as accurate as the memory of the person gathering the eggs.

Accordingly, it is the primary object of this invention to overcome the objections by providing an inexpensive device which may be readily attached to a cage floor and will automatically make a record of each egg laid as it rolls down the inclined floor to the collecting tray portion outside of the cage proper.

With this and other objects in view which will appear as the nature of the invention is better understood, the invention consists in the novel construction, combination, and arrangement of parts, hereinafer more fully described, illustrated and claimed.

A preferred and practical embodiment of the invention is shown in the accompanying drawings, in which:

Figure 1 is a side elevation of a portion of an inclined floor of a poultry cage having the egg counting device attached thereto.

Figure 2 is a front elevational view taken on the line 2—2 of Figure 1.

Figure 3 is a side elevational view taken on the line 3—3 of Figure 2, showing the counting device being actuated by an egg rolling down the inclined floor.

Figure 4 is a perspective view of the hanger member used to attach the counting device to the cage floor.

On farms where a cage system is employed in connection with egg production, the system includes a plurality of individual cages made of wire mesh and arranged adjacent to one another in a row or rows. The floor of the cage is inclined towards the front of the cage and extends beyond the front wall and is shaped to form a tray in which the eggs will remain until they are collected. Only those portions of a cage essential to an understanding of the invention have been shown in the attached drawing.

Referring now to the drawings in detail. W designates a portion of the front wall of a cage, said wall terminating a sufficient distance above floor F so as to leave an opening along the entire front wall of the cage large enough to allow an egg E to pass therethrough.

The wire mesh of the inclined cage floor comprises longitudinal wires 1 having lateral wires 2 welded or otherwise attached beneath wires 1 so as to provide an unobstructed path of travel for an egg rolling down said floor. That portion of the cage floor extending beyond the front wall W of the cage terminates in an arcuate upturned portion 3 forming a tray from which the eggs will be collected.

The counting device is preferably located adjacent the tray and consists of a trip mechanism comprising an axial shaft 4 having a plurality of prongs or fingers 5, 6, integral therewith. Spaced prongs 5 lie in the path of travel of the egg as it rolls down the inclined floor and are bent forwardly in the direction of travel of the egg. The prongs are spaced sufficiently close to each other so that at least one of them will be struck by the rolling egg to effect a rocking movement of shaft 4. Prongs 6 are vertically disposed in relation to prongs 5 and are located off to one end of shaft 4 on either side of a numbered, notched counting disc or ratchet wheel 7 which is rotatably mounted on said shaft. Said prongs 6 serve as guide means for an actuating pawl member 8 slidably mounted thereon and adapted to engage in a notch 9 of disc 7 when the trip mechanism is actuated by a rolling egg.

As a means of resetting the trip mechanism after an egg has rolled into tray 3, a counterweight 10 is attached to the lower end of one of prongs 5 which is bent in a direction opposite to the upper end of said prong, thereby causing the trip assembly to return to its normal, substantially upright position by gravity.

In order to prevent the disc 7 from advancing more than one notch at a time, there is provided a brake 11, preferably in the form of a spring wire, attached to wire 2 immediately in front of said disc and in constant frictional engagement therewith. The tension exerted by the brake on the disc is sufficient to prevent the latter from freely rotating in either direction, but insufficient to prevent it from advancing the desired one notch when a rolling egg actuates the trip mechanism.

To install the counting device on the cage floor, there are provided hanger members 12 comprising a body portion 13 having bifurcated hook portions 14 at one end thereof and a pair of openings 15 located centrally of said body. The hook portions 14 of the hangers are suspended from the cage floor at the junction of a longitudinal wire 1 and a lateral wire 2 so that the hooks 14 embrace wire 2. When thus arranged, the hanger is prevented from sliding on wire 1.

After the hangers 12 have been properly positioned, the lateral wire 2 is cut away at 2a to permit prongs 6 and disc 7 to be freely inserted between adjacent longitudinal wires 1a and 1b. The ends of shaft 4 are then inserted into one of corresponding openings 15 in each of hangers 12 so as to be freely rotatable therein. Finally, the brake 11 is attached to the wire 2b in such a manner that it will frictionally engage disc 7 for the purpose previously mentioned.

The second opening 14 in hanger 11 is provided so that a single hanger will serve as a support for the shaft 4 of additional counting devices installed on adjacent cages.

With the device installed, the operation is as follows: when a hen lays an egg, it will roll down the inclined floor F of the cage, strike prongs 5 integral with shaft 4 of the trip mechanism and move the prongs forwardly and downwardly out of its path, causing shaft 4 to rotate. As shaft 4 rotates, it carries with it prongs 6 on which pawl member 8 is slidably mounted. Pawl member 8 engages notch 9 of the counting disc and advances it one position.

After the egg has passed over the prongs 5, the trip mechanism will return to its original position due to gravitation of the counterweight 10. The return rearward movement is limited by prongs 5 abutting against wire 2. The device is thus in position to automatically record the next egg laid by the hen occupying that particular cage by repetition of the operation just described.

I claim:

In an article counting device adapted to be mounted on an inclined wire mesh ramp of a poultry cage, said cage being one of a row of cages, the combination comprising an axial shaft, means for rotatably mounting said shaft beneath said inclined surface, said means including a pair of hangers each having a body portion provided with bifurcated hooks at one end thereof, said hooks being adapted to engage a portion of said ramp, said body also being provided with a pair of openings, one of said openings of each pair adapted to receive an end of said axial shaft, the other of said pair of openings adapted to receive an end of the axial shaft of a counting device mounted on the next adjacent cage, a plurality of substantially vertical prongs fixed to said shaft and projecting above the plane of said ramp in the path of travel of the article to be counted, a pair of vertically extending prongs also fixed to said shaft near one end thereof, a notched counting disc rotatably mounted on said shaft between said pair of vertical prongs, a pawl member comprising an elongated bar having openings at each end thereof to slidably mount said pawl on said vertical prongs and above said counting disc, said pawl normally engaging said disc in actuating relationship thereto, whereby upon rotation of said shaft and the vertical prongs secured thereto, said pawl will engage one of said notches thus rotating said disc, a counterweight secured to the lower portion of at least one substantially vertical prong, resilient brake means having one of its ends attached to said ramp in front of said disc, the opposite free end of said brake means freely bearing on said disc to restrict unlimited rotation thereof.

References Cited in the file of this patent

UNITED STATES PATENTS

| | | |
|---|---|---|
| 288,976 | Chambers | Nov. 27, 1883 |
| 1,279,516 | Collins | Sept. 24, 1918 |
| 2,827,875 | Baumstark | Mar. 25, 1958 |